Nov. 13, 1956

M. O. NELSON 2,770,494

PORTABLE APPLICATOR FOR LIQUID FERTILIZERS, WEED KILLERS, AND THE LIKE

Filed Jan. 14, 1955

Inventor
Maurice O. Nelson

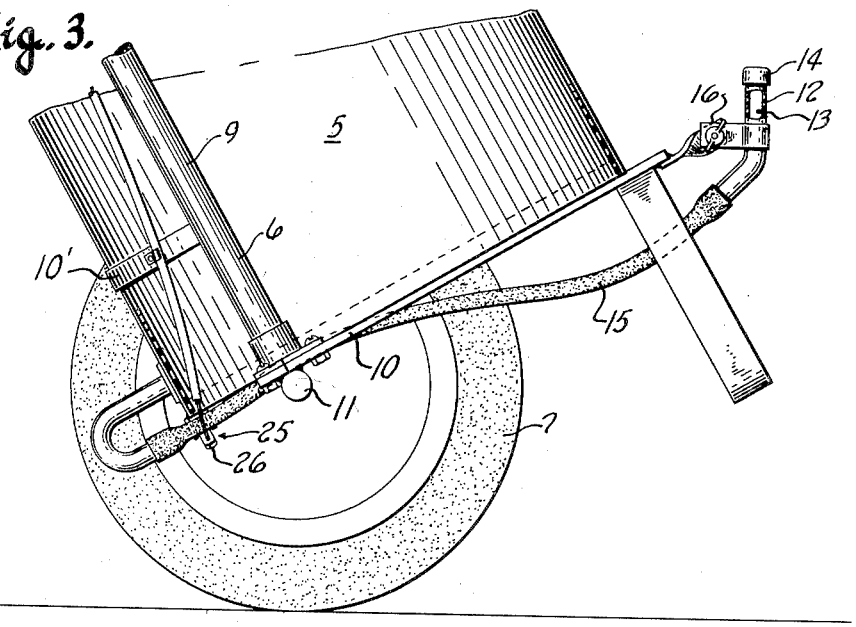
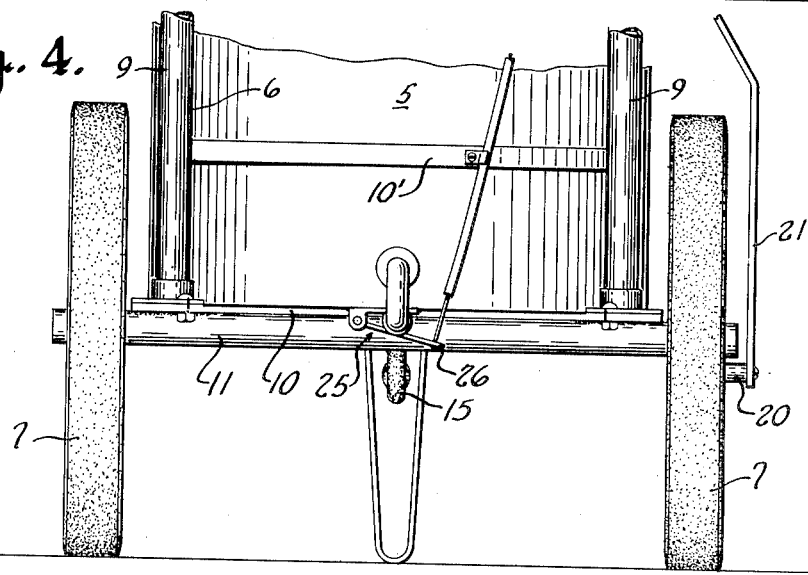

United States Patent Office 2,770,494
Patented Nov. 13, 1956

2,770,494

PORTABLE APPLICATOR FOR LIQUID FERTILIZERS, WEED KILLERS, AND THE LIKE

Maurice O. Nelson, Ixonia, Wis., assignor to The Farmwell Company, Inc., Ixonia, Wis., a corporation of Wisconsin Application January 14, 1955, Serial No. 481,739

6 Claims. (Cl. 299—43)

This invention relates to devices for applying liquid fertilizers, weed killers, growth retarders, insecticide solutions and the like to turf and soil, and has as its object to provide a portable applicator for this purpose which will assure accurate dosage and uniform distribution of the liquid upon the turf or soil during use of the device.

Another object of this invention is to provide an applicator for the purpose set forth, which is relatively inexpensive, and hence is admirably suited for use by the average home owner who takes pride in the appearance of his lawn and garden.

Heretofore, liquid solutions such as those contemplated for application by the device of this invention, were applied either by professionals using costly power driven sprayers or, if by the individual home owner or gardener, by means of manually held and manipulated spray nozzles connected by a hose to a tank carried by the operator and pressurized by means of a hand pump usually built into the tank. Neither method was too satisfactory and, in the case of a hand-held nozzle type of applicator, which in price range and purpose was closest to that of this invention, accuracy of dosage and uniformity of distribution was well nigh impossible.

These objectives are achieved by this invention through the combination of a discharge nozzle of fixed size maintained at a predetermined elevation above the ground by being mounted on a wheeled cart which also carries the solution tank, and a wheel driven air pump which maintains a predetermined pressure in the tank as the device is pushed along.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 3 is a side view of the lower portion of the device, with one wheel removed, and Figure 4 is a rear view of the lower portion of the device.

Figure 1:
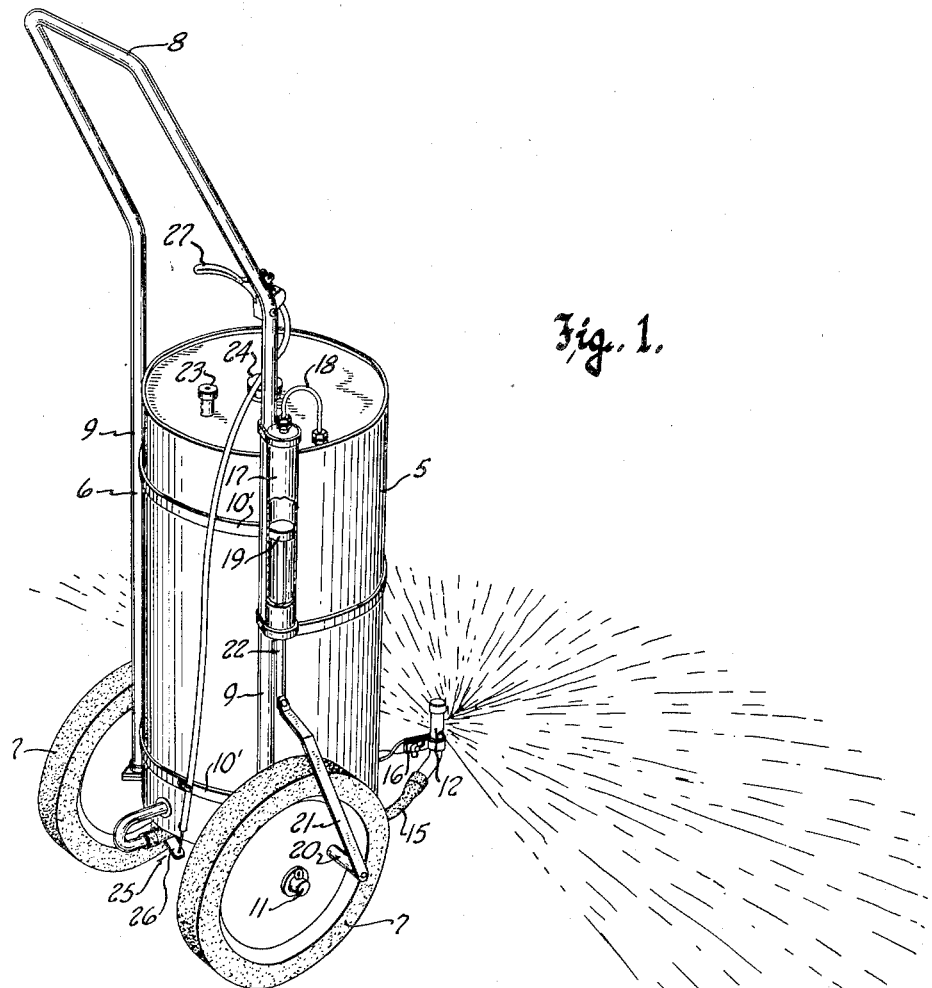
Figure 1 is a perspective view of a liquid applicator constructed in accordance with this invention.
Figure 2:
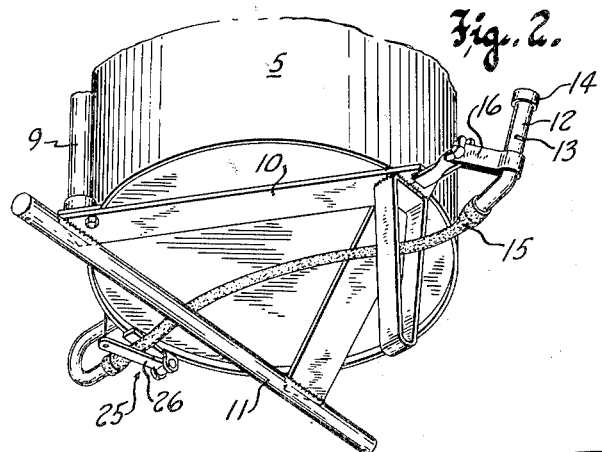
Figure 2 is a fragmentary perspective view of the bottom of the device with the wheels removed.

Referring particularly to the accompanying drawings, the numeral 5 designates a tank adapted to contain the solution to be applied, and to be pressurized. The tank is mounted on a cart consisting of a frame 6 supported on two wheels 7 and provided with a handle 8. Although the frame can be fashioned in any suitable way, it preferably has a pair of upright side rails 9 connected at the top by the handle 8 and at the bottom by a frame 10, and provided with strap-like cross bars 10' which form a cradle for the tank. It is to be noted that the tank is located in front of the handle and that its bottom rests upon the wheel axle 11 so as to be close to the ground.

In front of the lower portion of the tank is a nozzle 12. This nozzle consists of a short length of pipe provided with a transverse arcuate slit 13 medially of its ends. One end of the pipe is closed by a cap 14 and its other end is connected with the tank by a flexible duct 15. A bracket 16 secured to the bottom frame 10 adjustably mounts the nozzle in a generally upright position with its discharge slit 13 facing forwardly. The adjustability of the bracket 16 permits the nozzle to be swung a limited distance around a horizontal axis, and thus enables the nozzle to be so disposed that its discharge slit is substantially horizontal when the device is tilted back to the position it occupies in use. The spray which issues from the nozzle thus falls in a relatively flat arcuate curtain which reaches equal distances to both sides and covers a swath of uniform width as the device is pushed along. Obviously, by adjusting the angle of the nozzle, it is possible to increase and decrease the width of the swath covered by the spray, but for ordinary purposes it is best to have the slit horizontal when the device is in its position of use.

It is important to note that the slit 13 provides a discharge orifice of fixed size, and that the liquid projected therefrom is in the form of small droplets as distinguished from the fine atomized spray which characterizes the manually carried applicators of the type having a wand-like spray nozzle on the end of a hose. Hence, the liquid issuing from the nozzle slit 13 falls by gravity as a uniformly dense curtain.

This desired uniformity of discharge and distribution is further assured by the manner in which the tank is pressurized, and the fact that only a relatively low pressure is used. The pressure should not exceed a maximum of about five pounds per square inch and preferably is between three and five pounds. This range of pressure is automatically maintained as the device is propelled across the ground by a piston-type air pump 17. The pump is fixedly mounted on the frame, more specifically on one of the upright side rails 9, and has its outlet connected to the tank interior through a duct 18. Its piston 19 is drivingly connected to a crank pin 20 on one of the wheels, through a connecting rod 21 and the piston rod 22. Thus, as the device moves along, the pump is actuated and pressurizes the tank to the desired degree.

If the pump capacity is correctly selected, the desired pressure will result automatically when the operator walks at a normal pace, but if desired, a pressure relief valve 23 may be mounted on the tank and set to the pressure desired.

The tank is, of course, equipped with a suitable inlet opening and closure 24 and the connection between the tank and the nozzle incorporates a suitable shut-off 25. In the present case, this shut-off comprises a clamp 26 controlled by a hand lever 27 mounted on the handle.

From the foregoing description taken with the accompanying drawings, it will be readily seen that this invention provides an applicator for liquids which is admirably well adapted for the application of liquid fertilizers, weed killers, growth retarders and insecticides, by the relatively unskilled home owner or small gardener, since it assures accurate dosage and uniform distribution. The fixed size of the nozzle orifice and the uniform pressure coupled with the fact that the spray issuing from the nozzle covers a swath of uniform width, automatically achieves these objectives as the user walks along at a normal rate pushing the device before him. The concentration of the application can be varied by adjusting the nozzle to increase or decrease the width of the swath formed on one pass, the wider the swath the less the concentration.

It should also be understood that, although liquid fertilizers, weed killers, growth retarders and insecticides have been specifically mentioned as being solutions of the type for which the applicator of this invention has been particularly intended, it follows that the invention is by no means limited to use with these, or any one of these solutions. Hence, where the appended claims refer to "liquids," it is understood that not only these various solutions are contemplated but also others which could be applied by the device.

What I claim as my invention is:

1. A device for evenly applying liquids to turf and soil, comprising: a frame having handle means; wheels mounted on the frame and supporting it for free travel across the surface to be treated; a tank to contain the liquid, mounted on the frame with a portion thereof in front of the handle means; a discharge nozzle in front of the tank, said nozzle having a discharge port of fixed size shaped to produce a relatively flat arcuate spray of substantially uniform density which projects forwardly and to both sides to thereby cover a swath of predetermined width as the device is pushed along; a connection between the nozzle and the tank, including means for shutting off flow from the tank to the nozzle; a piston type air pump fixed with respect to the frame and tank; means connecting the discharge of the pump with the tank; and actuating means for the piston of the pump including a crank pin on one of the wheels and a connecting rod between the crank pin and the piston rod so that the movement of the device across the surface to be treated produces a pressure in the tank.

2. The device of claim 1 further characterized by the fact that the pump has a capacity to produce a pressure of between three and five pounds per square inch when the device is pushed along at the rate of a normal walk.

3. The device of claim 1 further characterized by the provision of a pressure relief valve on the tank adjustable to maintain a maximum pressure in the tank of less than five pounds per square inch.

4. A device for spraying liquids on turf and soil comprising: a wheeled cart having a wheel axle and spaced side rails extending upwardly from the axle and having a handle at the top thereof by which the cart may be pushed across the surface to be sprayed; a tank to contain the liquid, mounted on the cart with the bottom of the tank seated on the axle and the back of the tank supported by said side rails; pump means connected with the tank to produce pressure therein as the pump means is actuated; means securing the pump means to one of said side rails; an actuator for the pump means connected therewith and drivingly connected with one of the wheels of the cart so that movement of the cart actuates the pump means and creates a pressure in the tank; a discharge nozzle mounted in front of the lower portion of the tank and centrally disposed with respect thereto; and manually controllable duct means connecting the tank with the discharge nozzle, said nozzle having a discharge port of fixed size shaped to produce a relatively flat arcuate spray which projects forwardly and to both sides of the cart so that as the cart is pushed along a swath of uniform width is covered.

5. The device of claim 4 further characterized by the fact that the nozzle comprises a pipe closed at its outer end and connected at its inner end to said duct means, the pipe having a transverse slit extending partially therearound; and the means for mounting the nozzle supporting the pipe in an upright position with its slit facing forwardly.

6. The structure set forth in claim 5 further characterized by the fact that the means for supporting the pipe in an upright position includes means for adjusting the angle at which the pipe is disposed, about an axis parallel to the axis of the wheels so that the width of the swath covered by the spray may be changed by adjusting the angle of the pipe and hence the angle of the spray issuing therefrom.

References Cited in the file of this patent

UNITED STATES PATENTS

| | | |
|---|---|---|
| 1,168,580 | Troll | Jan. 18, 1916 |
| 1,656,171 | Cox | Jan. 13, 1928 |
| 2,347,267 | Jowers | Apr. 25, 1944 |
| 2,661,982 | Hudson | Dec. 8, 1953 |